United States Patent [19]

Quate

[11] Patent Number: 4,801,953

[45] Date of Patent: Jan. 31, 1989

[54] PERFORATED INK TRANSPORTS FOR ACOUSTIC INK PRINTING

[75] Inventor: Calvin F. Quate, Stanford, Calif.

[73] Assignee: Xerox Corporation, Stamford, Conn.

[21] Appl. No.: 57,875

[22] Filed: Jun. 2, 1987

[51] Int. Cl.[4] .............................................. G01D 15/16

[52] U.S. Cl. .................................. 346/140 R; 346/75; 400/126; 400/202.2

[58] Field of Search .............. 346/140 R, 140 PD, 75, 346/76, 1.1; 400/126, 202.2, 202.3, 202.4

[56] References Cited

U.S. PATENT DOCUMENTS

| | | | |
|---|---|---|---|
| 3,247,825 | 4/1966 | Johnson | 101/DIG. 13 |
| 4,263,601 | 4/1981 | Nishimura et al. | 346/1.1 |
| 4,308,547 | 12/1981 | Lovelady et al. | 346/140 |
| 4,630,075 | 12/1986 | Hori | 346/140 R |

FOREIGN PATENT DOCUMENTS 195863 10/1986 European Pat. Off. .

OTHER PUBLICATIONS

Krause, K. A., "Focusing Ink Jet Head", IBM Technical Disclosure Bulletin, vol. 16, No. 4, Sep. 1973.

Quate, Calvin F., "The Acoustic Microscope", Scientific American, vol. 241, No. 4, Oct. 1979, pp. 62–70.

Quate, Calvin F., "Acoustic Microscopy", American Institure of Physics, Physics Today, Aug. 1985, pp. 34–42.

*Primary Examiner*—E. A. Goldberg
*Assistant Examiner*—Mark Reinhart

[57] ABSTRACT

An ink transport comprising a perforated belt or web configured carrier having a longitudinally repetitive pattern of relatively large diameter apertures extending through it is provided for delivering a regularly refreshed supply of liquid ink to the printhead of an acoustic ink printer. Ink is loaded into the apertures from the top and/or the bottom. Furthermore, the apertures within each repeat of the aperture pattern are on centers which cause them to laterally align, on a one-for-one basis, with the individual pixel positions within a pagewidth address field. The printhead, in turn, includes one or more droplet ejectors, each of which supplies an acoustic beam which converges to a relatively sharp (i.e., narrow waist diameter) focus approximately on the free surface of the ink entrained in the apertures, and the radiation pressure exerted by each beam is modulated to acoustically eject individual droplets of ink from the apertures on command to print an image on a nearby recording medium. For regularly refreshing the ink presented to the printhead, the carrier is advanced longitudinally, suitably at a rate selected to bring successive repeats of its aperture pattern into alignment with the printhead for the printing of successive lines of the image.

11 Claims, 2 Drawing Sheets

FIG. 5
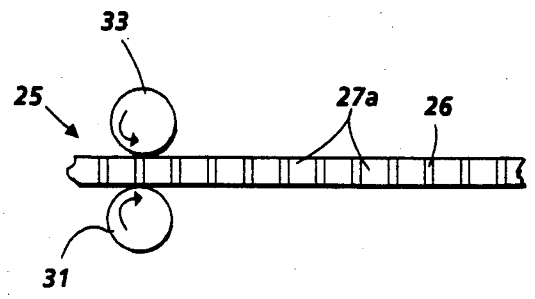
FIG. 6
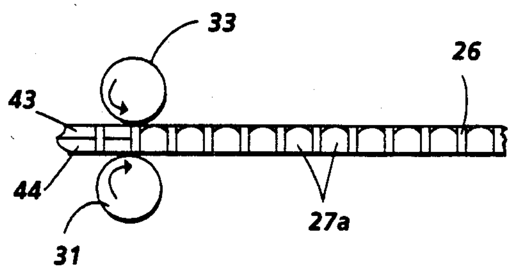
FIG. 7
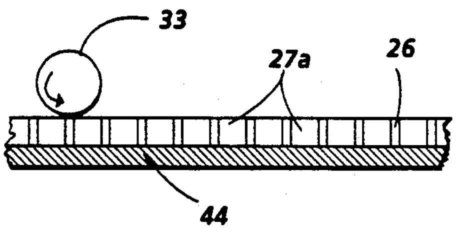
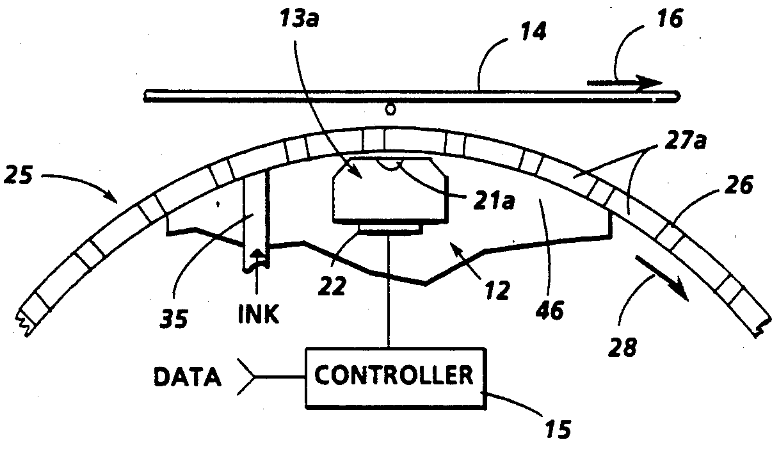
FIG. 8

PERFORATED INK TRANSPORTS FOR ACOUSTIC INK PRINTING

FIELD OF THE INVENTION

This invention relates to acoustic ink printing and, more particularly, to ink transports for acoustic ink printers.

BACKGROUND OF THE INVENTION

Acoustic ink printing is a promising direct marking technology because it does not require the nozzles or the small ejection orifices which have caused many of the reliability and pixel placement accuracy problems that conventional drop on demand and continuous stream ink jet printers have suffered.

It has been found that acoustic ink printers embodying printheads comprising acoustically illuminated spherical focusing lenses can print precisely positioned pixels (i.e., picture elements) at resolutions which are sufficient for high quality printing of relatively complex images. See, for example, the copending and commonly assigned U.S. patent applications of Elrod et al, which were filed Dec. 19, 1986 under Ser. Nos. 944,490, 944,698, and 944,701 on "Microlenses for Acoustic Printing", "Acoustic Lens Arrays for Ink Printing" and "Sparse Arrays for Acoustic Printing", respectively. It also has been discovered that the size of the individual pixels printed by such a printer can be varied over a significant range during operation, thereby accommodating, for example, the printing of variably shaded images. See, another copending and commonly assigned U.S. patent application of Elrod et al, which was filed Dec. 19, 1986 under Ser. No. 944,286 on "Variable Spot Size Acoustic Printing".

Although acoustic lens-type droplet ejectors currently are favored for acoustic ink printing, alternatives are available; including (1) piezoelectric shell transducers, such as described in Lovelady et al U.S. Pat. No. 4,308,547, which issued Dec. 29, 1981 on a "Liquid Drop Emitter", and (2) interdigitated transducers (IDT's), such as described in a copending and commonly assigned Quate et al U.S. patent application, which was filed Jan. 5, 1987 under Ser. No. 946,682 on "Nozzleless Liquid Droplet Ejectors" as a continuation of application Ser. No. 776,291 filed Sept. 16, 1985 (now abandoned). Furthermore, the known droplet ejector technology can be adapted to a variety of printhead configurations; including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing.

Each of the droplets ejectors of an acoustic ink printer typically launches a converging acoustic beam into a pool of liquid ink, with the angular convergence of this beam being selected so that it comes to focus at or near the free surface (i.e., the liquid/air interface) of the ink. Printing is performed by modulating the radiation pressure which each beam exerts against the free surface of the ink. More particularly, the modulation enables the radiation pressure of each beam to make brief, controlled excursions to a sufficiently high pressure level to overcome the restraining force of surface tension, whereby individual droplets of ink are ejected from the free surface of the pool of ink on command, with sufficient velocity to deposit them on a nearby recording medium.

Unfortunately, the performance of these acoustic ink printers tends to fall off sharply as a function of any significant variance of the free surface of the ink from the output focal plane of the droplet ejector or ejectors. Known droplet ejectors characteristically have a shallow depth of focus, so the depletion of the ink supply that occurs while images are being printed can reduce the level of its free surface sufficiently to noticeably degrade the printer performance, unless suitable provision is made to compensate for the depletion of the ink. Various liquid level control systems may be employed for that purpose, but an economical and reliable solution to this control problem is needed.

SUMMARY OF THE INVENTION

In accordance with the present invention, an ink transport comprising a perforated belt or web configured carrier having a longitudinally repetitive pattern of relatively large diameter apertures extending through it is provided for delivering a regularly refreshed supply of liquid ink to the printhead of an acoustic ink printer. Ink is loaded into the apertures from the top and/or the bottom. Furthermore, the apertures within each repeat of the aperture pattern are on centers which cause them to laterally align, on a one-for-one basis, with the individual pixel positions within a pagewidth address field. The printhead, in turn, includes one or more droplet ejectors, each of which supplies an acoustic beam which converges to a relatively sharp (i.e., narrow waist diameter) focus approximately on the free surface of the ink entrained in the apertures, and the radiation pressure exerted by each beam is modulated to acoustically eject individual droplets of ink from the apertures on command to print an image on a nearby recording medium. For regularly refreshing the ink presented to the printhead, the carrier is advanced longitudinally, suitably at a rate selected to bring successive repeats of its aperture pattern into alignment with the printhead for the printing of successive lines of the image.

If desired, dissimilar materials may employed to tailor the wetting characteristics of the aperture sidewalls, thereby imparting a preferred profile to the free surface of the ink entrained therein. For example, the upper and lower portions of the those sidewalls may be coated with an antiwetting agent and a wetting agent, respectively, to cause the free surface of the ink to bulge upwardly centrally of the apertures. Also, the perforated carrier may be embodied in multi-ply transports, such as by bonding it to a solid substrate or to a superimposed mesh screen.

BRIEF DESCRIPTION OF THE DRAWINGS

Still other features and advantages of this invention will become apparent when the following detailed description is read in conjunction with the attached drawings, in which:

FIG. 5 is a fragmentary and partially sectioned, simplified elevational view of a perforated ink transport in which the upper and lower inner sidewalls of the apertures have dissimilar wetting characteristics to impart a desired profile to the free surfaces of the ink that is entrained in the apertures;

FIG. 6 is a fragmentary and partially sectioned, simplified elevational view of a laminated ink transport constructed in accordance with this invention;

FIG. 7 is a fragmentary and partially sectioned, simplified elevational view of another laminated ink transport which embodies this invention; and FIG. 8 is a fragmentary and partially sectioned, simplified elevational view of an acoustic ink printer having an ink fountain for inking a perforated ink transport from the bottom.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
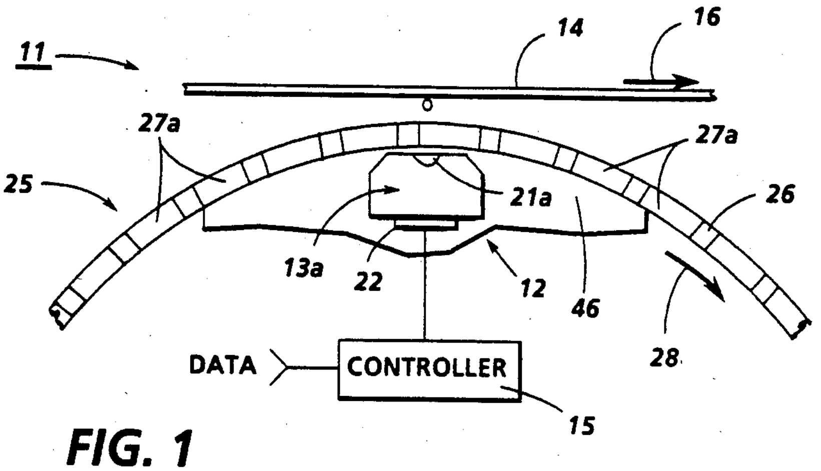
FIG. 1 is a fragmentary and partially sectioned, simplified elevational view of an acoustic ink printer having a perforated ink transport constructed in accordance with the present invention.
Figure 2:
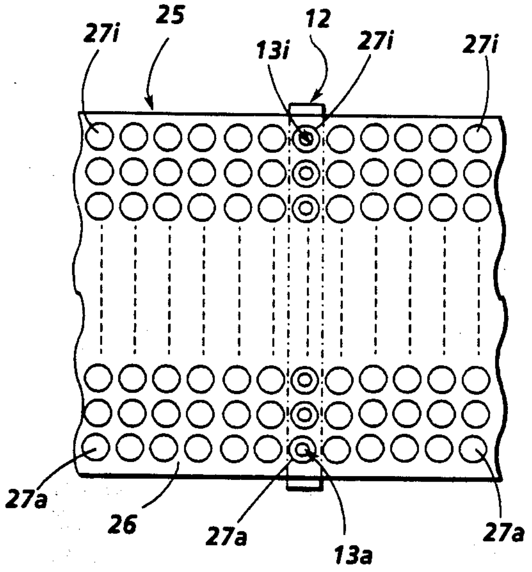
FIG. 2 is a reduced, fragmentary plan view of the ink transport shown in FIG. 1.

Turning now to the drawings, and at this point especially to FIG. 1, there is an acoustic ink printer 11 having a printhead 12 comprising an array of droplet ejectors 13*a*–13*i* (only the near end ejector 13*a* can be seen in FIG. 1) for printing images on a suitable recording medium 14 in response to image data applied to a controller 15. In this particular embodiment, the droplet ejectors 13*a*–13*i* are arranged on equidistant centers in a linear array (shown in phantom line FIG. 2) for line printing. Accordingly, the recording medium 14 is advanced during operation in a cross-line direction relative to the printhead 12, as indicated by the arrow 16. Nevertheless, it will be apparent that other printhead configurations could be employed, including some that would require an appropriately synchronized relative scan motion (not shown) between the printhead 12 and the recording medium 14 along an axis orthogonal to the arrow 16. Indeed, even though a linear array has been illustrated, it is to be understood that it may be preferable in practice to employ multiple row staggered droplet ejector arrays (not shown) for line printing and the like, because the staggering of the droplet ejectors permits their center-to-center spacing to be increased without requiring a corresponding reduction in the printing resolution that can be achieved.

As shown, the droplet ejectors 13*a*–13*i* have spherical focusing lenses 21*a*–21*i* (again, only the near end lens 21*a* can be seen) which are illuminated by acoustic waves generated by a piezoelectric transducer 22, thereby causing a converging acoustic beam to radiate from each of the lenses 21*a*–21*i*. The lenses 21*a*–21*i* are laterally distributed to individually address laterally displaced pixel positions within a pagewidth imaging field, so the controller 15 independently amplitude, frequency or pulse width modulates the acoustic illumination of each of the lenses 21*a*–21*i* in accordance with the image data for the pixels which are to be printed in those respective pixel positions during the printing of successive lines of an image. As a result, the radiation pressures of the acoustic beams which radiate from the lenses 21*a*–21*i* are correspondingly modulated to print the image on the recording medium 14, as more fully described hereinbelow. Piezoelectric shell transducers and IDT's (not shown) are known alternatives to the lens-type droplet ejectors 13*a*–13*i* that have been shown, so it should be understood that the specific configuration of the printhead 12 is a factor to consider while selecting the type of droplet ejector that is to be employed, although the detailed criteria for making a well reasoned decision on that subject are beyond the scope of the present invention. Fortunately, at least when any of the aforementioned droplet ejectors are utilized, the controller 15 can perform the dual functions (1) controlling the ejection timing of the ejectors 13*a*–13*i* and of (2) modulating the size of the individual pixels that they print. See the aforementioned Elrod et al application, Ser. No. 944,286, which is hereby incorporated by reference. As will be recalled, pixel size control, whether accomplished by modulating the size of the individual droplets of ink that are ejected and/or by varying the number of ink droplets that are deposited per pixel, is useful for enhancing the perceived quality of some images, such as by imparting a controlled shading to them.

In accordance with the present invention, the printer 11 includes a perforated ink transport 25 for delivering a regularly refreshed supply of ink of generally constant depth to the printhead 12. To carry out that function, the transport 25 comprises is a thin plastic or metallic web or belt-like carrier 26 which has a longitudinally repetitive pattern of relatively large diameter apertures 27*a*–27*i* (FIG. 2) extending through it on centers selected to cause the individual apertures 27*a*–17*i* within each repeat of the pattern to laterally align on a one-for-one basis with the individual pixel positions or addresses within the pagewidth image field. As will be seen, the carrier 26 is advanced during operation (by means not shown) in a longitudinal direction, as indicated by the arrow 28, so that it passes through an inking station 29, where ink is loaded into its apertures 27*a*–27*i*, and then across the printhead 12, where individual droplets of ink are ejected from its apertures 27*a*–27*i* on command to print an image on the recording medium 14. The carrier 26 may be composed of various polymers, such as mylar, polypropolene and similar polyimides, or metals, such as nickel.

Each of the aperture 27*a*–27*i* is filled with a thin film of ink at the Inking station 29. Preferably, these ink films all are of essentially the same thickness or depth. For that reason, the diameters of the apertures 27*a*–27*i* all are approximately the same, and a generally homogeneous ink is employed. The diameters of the apertures 27*a*–27*i* are large compared to the waist diameters of the focused acoustic beams that radiate from the lenses 21*a*–21*i*, but are sufficiently small to enable the ink to form stable films across them. As will be appreciated, the generally uniform thickness of these ink films makes it relatively easy to maintain the free surface of the ink that is being presented to the printhead 12 at any given time substantially in the output focal plane of its droplet ejectors 13*a*–13*i*. Indeed, that design goal can be realized simply by advancing the carrier 26 across the printhead 12 at a suitably high rate to ensure that the level of the free surface of the ink is being presented to the printhead 12 at any given time remains substantially constant under even the most demanding operating conditions (i.e., when droplets are being ejected at a peak rate).

Figure 3:
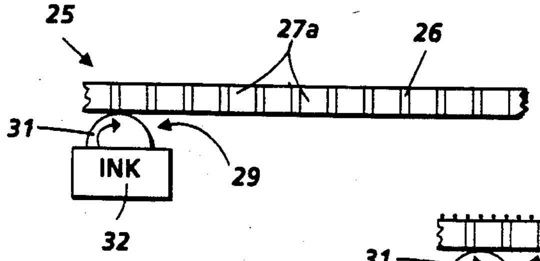
FIG. 3 is a fragmentary and partially sectioned, simplified elevational view of a single roll inking mechanism for loading ink into the apertures of the transport shown in FIGS. 1 and 2 from the bottom.
Figure 4:
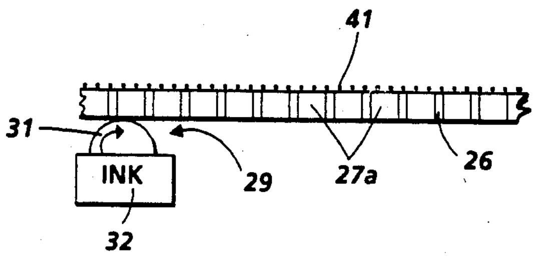
FIG. 4 is a fragmentary and partially sectioned, simplified elevational view of a dual roll inking mechanism for loading ink into the apertures of the transport shown in FIGS. 1 and 2 from the top and the bottom.

Various inking mechanisms may be employed for loading ink into the apertures 27*a*–27*i* from the bottom only (FIGS. 3, 4 and 8), from both the top and the bottom (FIGS. 5 and 6), or from the top only (FIG. 7). For example, as shown in FIGS. 3 and 4, ink is loaded into the bottom of the apertures 27*a*–27*i* by a rotating roll 31 which transfers ink into them from a reservoir 32. If desired, as depicted in FIGS. 5 and 6, another ink coated rotating roll 33 may be used in combination with the roll 31 for loading ink into the apertures 27*a*–27*i* from the top and the bottom, respectively. Or, as illustrated in FIG. 7, the ink coated roll 33 may be employed by itself for loading ink into the apertures 27*a*–27*i* solely from the top. While roll-type inking mechanisms usually are suitable for loading ink into the apertures 27*a*–27*i*, there are many other types of applicators which could be used. For example, as shown in FIG. 8, a fountain 35 is provided for loading ink into the apertures 27*a*–27*i* from the bottom.

In practice, the inking mechanism may designed to accommodate a preferred configuration of the ink transport 25 and/or a desired presentation of the ink to the printhead 12. For example, as shown in FIG. 4, to inhibit dust and other contaminants from falling into the the ink entrained in the apertures 27*a*–27*i*, the upper surface of the carrier 26 is bonded to and covered by a fine mesh screen 41 (i.e., the mesh size of the screen 41 is significantly smaller than the diameter of the apertures 27*a*–27*i*). Therefore, in that embodiment, ink is loaded into the apertures 27*a*–27*i* from the bottom, such as by the inking roll 31. Referring to FIG. 7 for another example, it will be seen that the carrier 26 is laminated on top of a thin film solid substrate 42, so the ink is loaded into the apertures 27*a*–27*i* from the top, such as by the inking roll 33. Returning to FIG. 6 for still another example, it will be observed that ink is loaded into the apertures 27*a*–27*i* from the bottom and the top, such as by the inking rolls 31 and 33, respectively, to cause the free surface of the ink entrained in the apertures 27*a*–27*i* to conform to a preselected profile as dictated by the dissimilar wetting characteristics of the upper and lower sections 43 and 44, respectively, of the inner sidewalls of the apertures 27*a*–27*i*. More particularly, as shown in FIG. 7, the upper and lower sections 43 and 44 of the aperture sidewalls are composed of materials which are poorly and thoroughly wetted, respectively, by the ink, with the result that the free surfaces of the entrained ink films bulge upwardly centrally of the apertures 27*a*–27*i*, thereby reducing the radiation pressure that is required to eject droplets of ink therefrom. These and other dissimilar wetting characteristics may be provided by coating the upper and lower sections 43 and 44 of the inner sidewalls of the apertures 27*a*–27*i* with materials having dissimilar wetting properties or by using a multi-ply laminate of materials having dissimilar wetting properties to form the carrier 26.

Regardless of the method or means that are employed for loading ink into the apertures 27*a*–27*i*, the printhead 12 must be acoustically coupled to the ink that is presented to it during operation. This means that the interface between the the ink and printhead 12 must be free of air pockets or anything else which might prevent such acoustic coupling from being achieved. Furthermore, in practice, it may be desirable to confine the ink to the apertures 27*a*–27*i*, so the upper and lower surfaces of the carrier 26 may be coated or otherwise treated with an anti-wetting agent to inhibit the ink from wetting them.

To reduce the impedance mismatch losses that occur at the interface between the printhead 12 and the ink that is being presented to it, the printhead 12 advantageously has an impedance matching overcoating 46 deposited on it as depicted in FIGS. 1 and 8). See a copending and commonly assigned Elrod et al U.S. patent application, which was filed Dec. 19, 1986 under Ser. No. 944,145 on "Planarized Printheads for Acoustic Printing" for a more detailed discussion of this feature. That application is hereby incorporated by reference, but it will be noted that the overcoating 46, which typically is composed of a plastic, has a smooth outer surface which slidingly supports the carrier 26 as it passes across the printhead 12. Indeed, as shown, the overcoating 46 preferably has an arcuate crowned profile which causes the carrier 26 to wrap on it and to remain in intimate mechanical contact with it. To achieve the desired acoustic matching, the acoustic velocity of the overcoating 46 is selected to be greater than the acoustic velocity of the ink but less than the acoustic velocity of the printhead 12.

CONCLUSION

In view of the foregoing, it will now be understood that the present invention provides a reliable and economical ink transport for acoustic ink printers. Furthermore, it will be evident that there are a variety of different implementations of this invention, including not only those which have been described, but also those which will suggest themselves as a result of this disclosure.

What is claimed:

1. In an acoustic ink printer having a printhead including at least one droplet ejector means for supplying an acoustic beam which converges to a focus approximately in a predetermined focal plane, such that said acoustic beam has a relatively narrow waist diameter in said focal plane; an improved ink transport for delivering ink to said printhead, said ink transport comprising a carrier having a repetitive pattern of relatively large diameter apertures extending through it on centers which cause the apertures within each repeat of said pattern to laterally align on a one-for one basis with individual addresses of a pagewidth image field, said carrier being advanced at a predetermined rate in a longitudinal direction to pass over said printhead approximately in said focal plane, means for loading generally uniformly thick films of liquid ink into each of said apertures as said carrier approaches said printhead, and controller means coupled to said ejector means for modulating said acoustic beam, whereby individual droplets of ink are ejected on command from said apertures to print pixels at selected addresses in said image field, with the rate at which said carrier is advanced being sufficiently high to ensure that the thickness of the ink films that are presented to said printhead at any given time is substantially constant.

2. The improvement of claim 1 wherein said ink is loaded into said apertures from below.

3. The improvement of claim 2 wherein said carrier is bonded to a superimposed mesh screen which has a mesh size that is significantly smaller than the diameter of said apertures, whereby said screen inhibits contamination of the ink entrained in said apertures.

4. The improvement of claim 1 wherein ink is loaded into said apertures from above.

5. The improvement of claim 4 wherein said carrier is bonded to a solid substrate.

6. The improvement of claim 1 wherein said apertures are bounded by sidewalls which have upper and lower sections that present dissimilar wetting characteristics to said ink, and the wetting characteristics of the upper and lower sections of said aperture sidewalls are selected to cause the ink films entrained in said apertures to assume a predetermined profile.

7. The improvement of claim 6 wherein ink is loaded into said apertures from above and below, and the wetting characteristics of the upper and lower sections of said aperture sidewalls are selected to cause said ink films to bulge upwardly centrally of said apertures.

8. The improvement of any of claims 1–7 wherein said printhead includes a plurality of droplet ejector means for supplying respective acoustic beams, each of which converges to a focus approximately in said focal plane;

said droplet ejector means are on centers selected to enable them to address respective addresses within said image field; and said controller independently modulates said acoustic beams to selectively print pixels at said addresses.

9. The improvement of claim 8 wherein said carrier has upper and lower surfaces which are poorly wetted by said ink, whereby said ink is essentially confined to said apertures while being transported toward said printhead.

10. The improvement of claim 8 wherein said printhead is overcoated with an acoustic matching material, and said ink transport mechanically bears against said acoustic matching material.

11. The improvement of claim 10 wherein said acoustic matching material has an arcuate crowned profile, and said ink transport arcuately wraps over the crown of said matching material.

* * * * *